W. M. PULVER & L. P. VERNON.
BEET TOPPING MACHINE.
APPLICATION FILED AUG. 29, 1916.
1,258,456.
Patented Mar. 5, 1918.
4 SHEETS—SHEET 1.
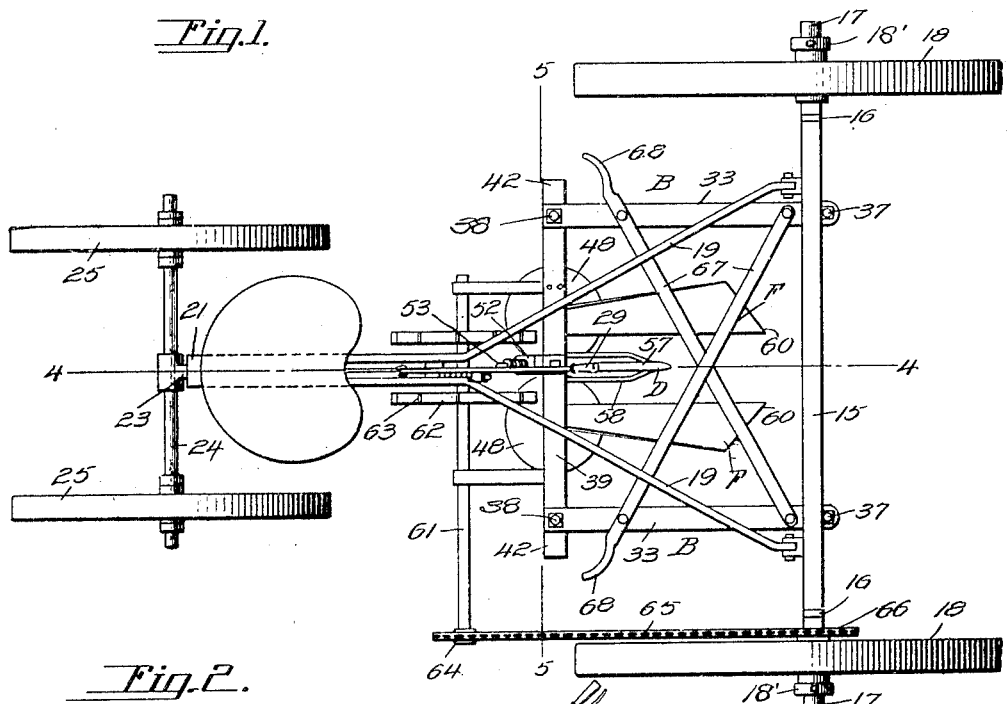
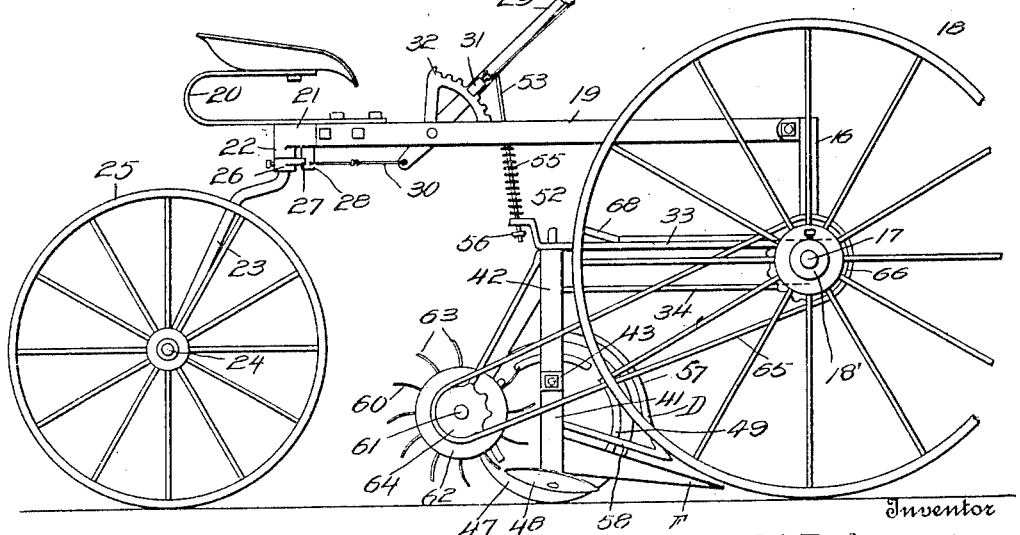
Witnesses
F. L. Gibson.
Inventor
Ward M. Pulver.
Lovell P. Vernon.
By Victor J. Evans
Attorney

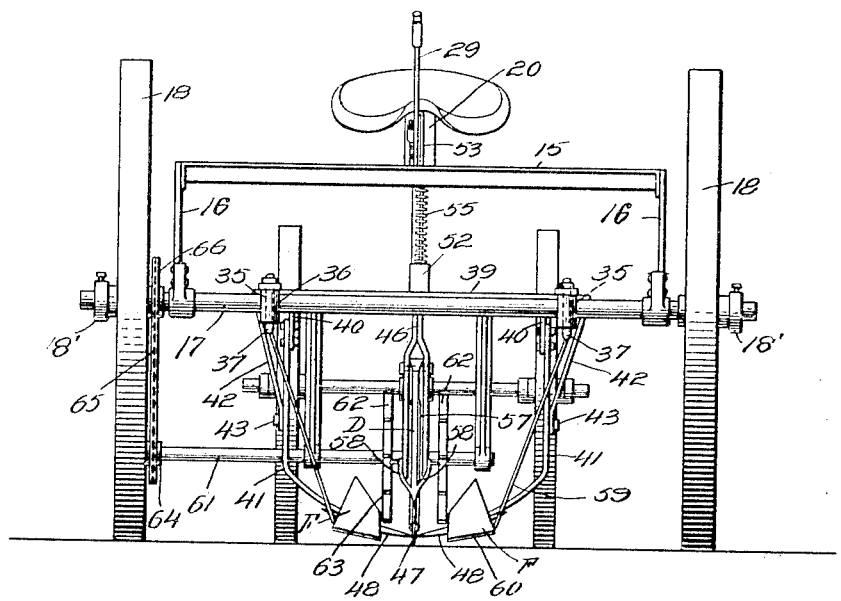
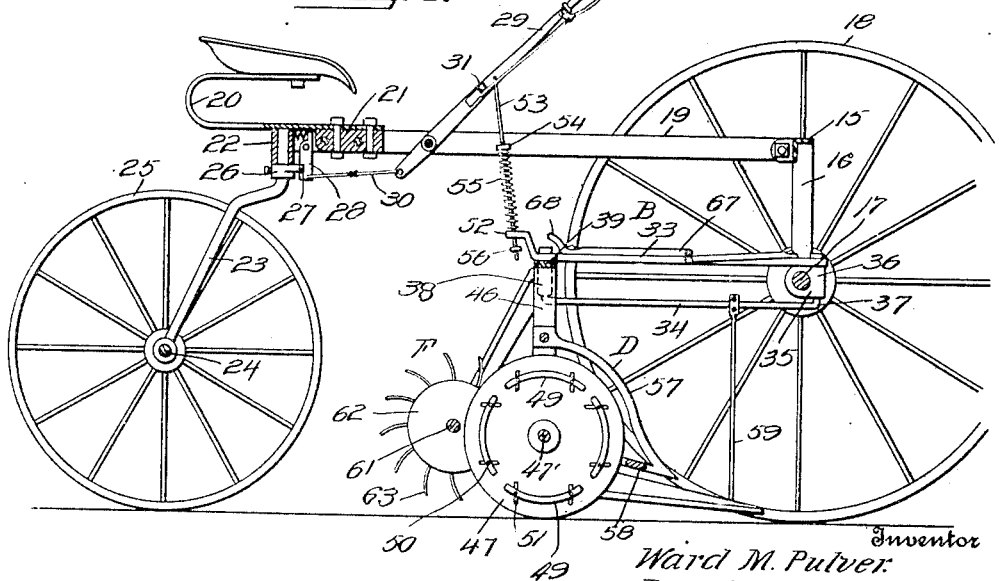

W. M. PULVER & L. P. VERNON.
BEET TOPPING MACHINE.
APPLICATION FILED AUG. 29, 1916.

1,258,456.

Patented Mar. 5, 1918.
4 SHEETS—SHEET 3.

Witnesses
F. C. Gibson.

Inventor
Ward M. Pulver.
Lovell P. Vernon.

By Victor J. Evans
Attorney

W. M. PULVER & L. P. VERNON.
BEET TOPPING MACHINE.
APPLICATION FILED AUG. 29, 1916.

1,258,456.

Patented Mar. 5, 1918.
4 SHEETS—SHEET 4.

Inventor
Ward M. Pulver.
Lovell P. Vernon.

Witnesses

By Victor J. Evans
Attorney

UNITED STATES PATENT OFFICE.

WARD M. PULVER AND LOVELL P. VERNON, OF SEDGWICK, COLORADO.

BEET-TOPPING MACHINE.

1,258,456.   Specification of Letters Patent.   Patented Mar. 5, 1918.

Application filed August 29, 1916. Serial No. 117,529.

*To all whom it may concern:*

Be it known that we, WARD M. PULVER and LOVELL P. VERNON, citizens of the United States, residing at Sedgwick, in the county of Sedgwick and State of Colorado, have invented new and useful Improvements in Beet-Topping Machines, of which the following is a specification.

This invention relates to beet topping machines, and it has for its object to produce a device of simple and improved construction whereby the leafy tops of sugar beets may be detached prior to extracting the roots from the ground.

A further object of the invention is to produce a machine of simple and improved construction whereby the leafy tops of the beets will be split vertically to facilitate the operation of the substantially horizontal cutting members, whereby they are detached from the root.

A further object of the invention is the provision of a vertically disposed rotary cutting member which is constructed and arranged to limit the cutting action thereof.

A further object of the invention is the provision of fenders or gathering members to gather the leafy tops in advance of the cutting apparatus and also a divider to partly divide the tops in advance of the vertically disposed cutting member.

A further object of the invention is the provision of means for casting aside and disposing of the leafy tops after being severed from the beet roots.

A further object of the invention is the provision of a simple and improved construction and arrangement of parts whereby the cutting apparatus constituting the topping device may be guided independently of the wheeled supporting frame whereby it is carried, thus enabling the operator to meet any inequalities in the row.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a top plan view of a machine constructed in accordance with the invention.

Fig. 2 is a side elevation of the same.

Fig. 3 is a front elevation.

Fig. 4 is a longitudinal vertical sectional view taken on the line 4—4 in Fig. 1.

Corresponding parts in the several figures are denoted by like characters of reference.

Figure 5:
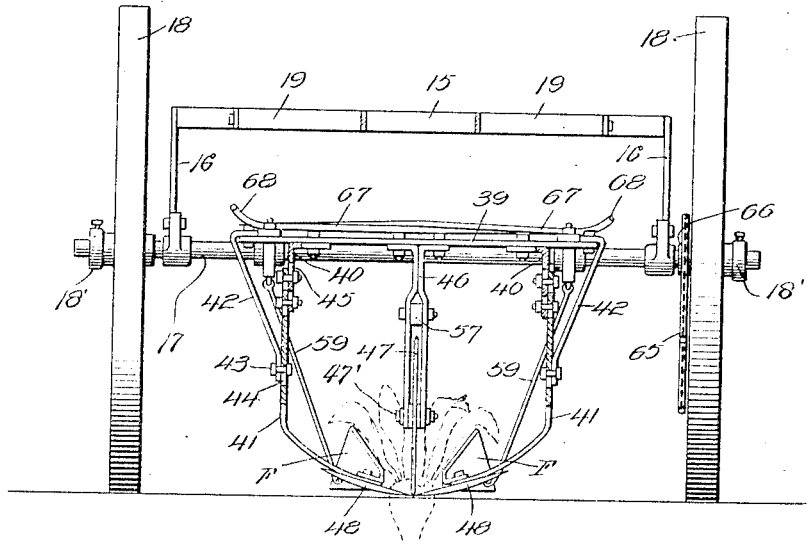
Fig. 5 is a vertical transverse sectional view taken on the line 5—5 in Fig. 1.
Figure 6:
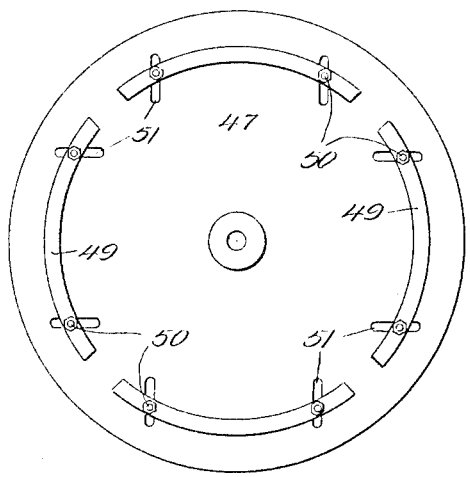
Fig. 6 is a side elevation of the vertical cutting disk detached.
Figure 7:
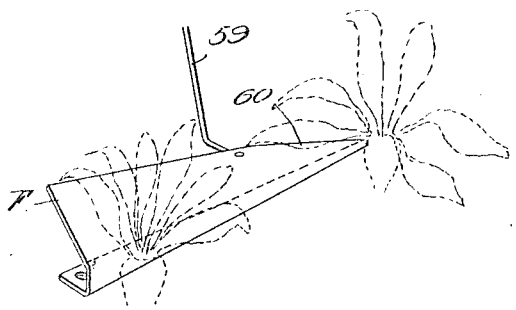
Fig. 7 is a perspective detail view of one of the fenders and gatherers.
Figure 9:
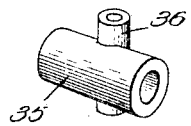
Fig. 9 is a perspective detail view, enlarged, of the hinge member connecting the topping frame with the axle of the machine.
Figure 8:
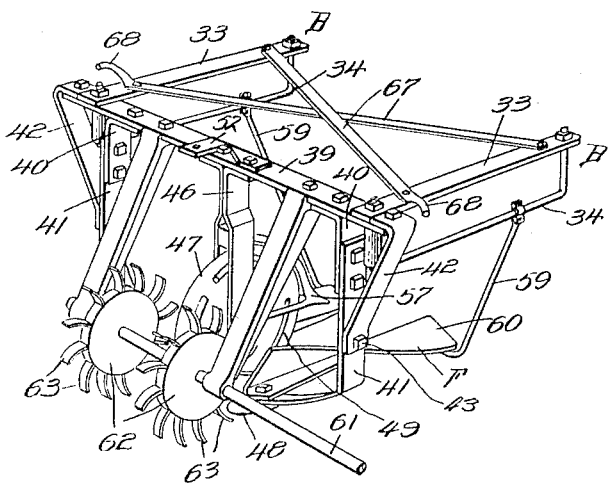
Fig. 8 is a perspective detail view of the topping frame and related parts.

The frame of the machine includes a top cross bar 15 provided at the ends thereof with vertical posts 16, the lower ends of which are supported on the axle 17 having ground wheels 18. The wheels are mounted on the axle for adjustment longitudinally of the latter, said wheels being retained in position by means of set collars 18' or other well known means, the object of such adjustment being to enable the machine to operate on rows of plants variously spaced apart. Pivotally connected with the top bar 15 are rearwardly convergent side members 19, the rearward ends of which are connected together to support the seat spring 20. Connected with the side members is a bracket 21 having a bearing sleeve 22 wherein is journaled the upper end of a truck standard 23, the lower end of which is connected with an axle 24 carrying the trailer wheel 25. The standard 23 has a collar 26 equipped with a notch 27 that is engaged by a spring actuated dog 28 constituting a locking member whereby the standard 23 may be secured against rotation, thereby presenting the trailer wheels in a straight line. When a turn is to be made, the locking dog may be released or disengaged from the notched collar by means of a hand lever 29 one arm of which is connected with the dog by a collapsible link rod 30 which is composed of two slidably connected members, the object being to enable the lever 29 to be moved freely in one direction without affecting the position of the locking dog. The hand lever 29 is equipped with a stop member 31 engaging a quadrant 32, whereby said lever and certain parts connected therewith may be secured at various adjustments.

The topping frame of the improved device includes in its construction side members B, each of which is composed of substantially parallel top and bottom members 33, 34. Mounted for rocking movement on the axle are bearing members each consisting of a sleeve 35 having an angularly disposed cuff 36, the axis of the cuff being substantially at right angles to the axis of the sleeve. The bottom bars 34 of the side members B are provided with upturned front and rear ends 37, 38 producing spindles, the forward spindles 37 being journaled in the cuffs 36, and the top bars 33 being mounted on the upper extremities of the spindles 37, 38 where they are properly secured. The rearward spindles 38 are connected together by a cross bar 39 which is pivotally connected with said spindles and which combines with the side members B, B to form a frame structure which is capable of rocking movement about the axis of the axle 17 and the sleeves 35, and also of lateral swinging movement; the cross bar 39 being maintained in parallel relation to the axle 17 by the side members B. The cross bar is provided near the ends thereof with angular brackets 40 to support the disk carrying standards 41 which are reinforced by means of angle braces 42; the standards 41 being connected with the brackets 40 and the braces 42 by means of bolts 43 for the passage of which the standards are provided with slots 44, and the angle brackets and braces are provided with slots 45, said slots 44 and 45 being formed angularly with respect to each other in order that vertical as well as horizontal adjustment may be effected between the parts. The precise manner of connecting the standards with the cross bar may be varied, but it is desirable that the element of adjustability between the parts be preserved. The cross bar 39 also supports midway between its ends a downwardly extending forked standard 46 carrying the vertically disposed cutting disk 47, said disk being mounted on a shaft 47′.

The lower ends of the standards 41 are bent or curved inward to support the approximately horizontal cutting disks 48 which are mounted thereon for rotation. It is preferred that the cutting edges of the disks 48 should practically meet and coincide with the cutting edge of the disk 47. This arrangement, however, may be varied, as it may be found desirable to permit the edges of the disks 48 to overlap preferably to the rearward of the cutting edge of the disk 47, it being simply understood that the several disks are to be mounted in the most advantageous manner for the performance of their allotted work.

The vertically disposed central cutting disk 47 is provided on its opposite side faces with arcuate flanges 49, said flanges being made of half round iron, and said flanges being connected with the disk by means of bolts 50 extending through slots 51 that will permit of the flanges being moved inward or outward with respect to the axis of the disk. In practice four flanges are mounted on each side of the disk, said flanges being so arranged as to be approximately concentric with the axis of the disk, and said flanges being spaced apart at the ends thereof so as to permit the desired adjustment to be made. These flanges combine to form a stop device whereby the depth of the cut of the disk 47 will be gaged. Within the scope of the invention a single continuous flange may be fixed on either face of the disk or on both faces thereof to constitute the desired stop member, but by making the flanges adjustable, as described, the depth of the cut may be varied which will be sometimes found desirable.

The cross bar 39 of the topper frame has a rearwardly extending bracket 52 which is apertured for the passage of a rod 53, the upper end of which is flexibly connected with the hand lever 29, said rod being provided near its upper end with a stop member 54 forming an abutment for one end of a spring 55 which is coiled about the rod 53, and the other end of which abuts on the bracket 52, the tension of the spring being exerted to press downwardly against the bracket and related parts. That end of the rod 53 which is extended below the bracket 52 has a stop member 56 whereby when the lever 29 is moved in one direction, the underside of the bracket 52 will be engaged, thereby exerting a lifting action on said bracket and related parts. It will thus be seen that by moving the lever in one direction, the spring 55 will be compressed, thus enabling a variable pressure to be exerted in a downward direction against the topper frame of which the bracket 52 forms a part, the topper frame being sustained at the desired elevation for advantageous operation in such a manner as to be capable of yielding upwardly against the tension of the spring 55. On the other hand, by moving the lever 29 in the opposite direction, the topper frame will be lifted from the ground to a convenient position for turning the machine about for transporting it from place to place, while at the same time the lever through the medium of the collapsible link rod 30 will disengage the dog 28 from the notched collar 26, thus permitting the standard carrying the trailer wheels to swivel about its axis.

Connected with the forked standard 46 is a divider D having three arms, one of which, 57, is secured on the standard 46 near the upper end thereof, while the two remaining arms 58 are connected with the limbs of the fork between which the disk 47 is mounted for rotation. When the device is in operation the divider will engage the leafy tops of the beets and will assist in dividing the same in advance of the cutting disk 47, thereby facilitating the operation of said disk.

Fenders or gathering members F are mounted on the standards 41, the forward ends of said fenders being also connected with the bottom bars 34 of the side members B by means of connecting rods 59. Each fender is provided at its forward end with a bent portion forming a substantially horizontal flange 60, the purpose of which is to engage and lift such of the leafy tops as have fallen on the ground outwardly with respect to the beet roots, lifting said tops and gathering them for the purpose of being conveniently operated on by the substantially horizontal cutting disk 48. It will be observed that the fenders F are secured on the inner faces of the standards 41 and that said fenders at the two sides of the machine converge somewhat in a rearward direction.

Supported to the rearward of the vertical cutting disk 47 is a shaft 61 supporting hubs 62 having radially extending curved fingers 63, said shaft being also provided with a sprocket wheel 64 connected by a chain 65 with a sprocket wheel 66 on the hub of one of the ground wheels 18. By this simple device the leafy tops that have been severed from the beet roots will be thrown forcibly to a position where they will not interfere with the subsequent extracting of the beet roots from the ground.

Connected rigidly with the side members B of the topper, preferably with the top bars 33 near the forward ends thereof are foot levers 67 that extend obliquely in a rearward direction, crossing each other diagonally, and the rearward extremities of said levers being provided with treadles 68 to be actuated by the feet of the operator, who, by means of this device, will be enabled to swing the topper frame laterally when required to conform to any inequalities in the row of beets that is to be operated upon.

From the foregoing description, taken in connection with the drawings hereto annexed, it will be seen that a machine or device has been provided of simple and inexpensive construction by means of which the leafy tops of beet roots may be lifted from the ground, bunched, divided and cut vertically, as well as being severed by the action of substantially horizontally disposed cutting members, the detached tops being thrown to an out-of-the-way position. The machine may be operated by draft animals or by mechanical power such as a tractor, and it will be under the complete control of the driver or operator for whom a convenient seat is provided.

Having thus described the invention, what is claimed as new, is:—

1. In a beet topping machine, a frame having a wheel carrying axle, sleeves mounted for rocking movement on the axle and having angularly disposed cuffs, and a topping frame having side members including top and bottom bars, the bottom bars having upturned spindles at their forward ends engaging the cuffs and upturned spindles at their rearward ends, and the top bars being mounted on the upturned spindles.

2. In a beet topping machine, a frame having a wheel carrying axle, sleeves mounted for rocking movement on the axle and having angularly disposed cuffs, and a topping frame having side members including top and bottom bars, the bottom bars having upturned spindles at their forward ends engaging the cuffs and upturned spindles at their rearward ends, and the top bars being mounted on the upturned spindles, a cross bar on which cutting apparatus is mounted, and pivotal connections between said cross bar and the side members.

3. In a beet topping machine, a frame having a wheel carrying axle, sleeves mounted for rocking movement on the axle and having angularly disposed cuffs, and a topping frame having side members including top and bottom bars, the bottom bars having upturned spindles at their forward ends engaging the cuffs and upturned spindles at their rearward ends, and the top bars being mounted on the upturned spindles, a cross bar on which cutting apparatus is mounted, and pivotal connections between said cross bar and the side members, the side members of the top frame being provided with rearwardly extending obliquely disposed foot levers whereby the topping frame may be swung laterally.

4. In a beet topping machine, a wheeled carrying frame, a topping frame connected therewith for rocking movement in a vertical plane and also for lateral swinging movement, said topping frame including a cross bar with which the cutting apparatus is connected.

5. In a beet topping machine, a topping frame supported for rocking movement in a substantially vertical plane and also for lateral swinging movement, said frame including side members and a cross bar, cutting apparatus supported by the cross bar, a spring whereby the frame is pressed in a groundward direction, and levers connected with the side members of the topping frame and having pedals whereby the frame may be swung laterally.

6. In a beet topping machine, a topping frame supported for rocking movement in a substantially vertical plane and also for lateral swinging movement, said frame including side members and a cross bar, cutting apparatus supported by the cross bar, a spring whereby the frame is pressed in a groundward direction, levers connected with the side members of the topping frame and having pedals whereby the frame may be swung laterally, and a lever whereby the topping frame may be lifted to move the cutting apparatus clear of the ground.

7. In a beet topping machine, a topping frame supported for rocking movement in a substantially vertical plane and also for lateral swinging movement in a substantially horizontal plane, cutting apparatus carried by said frame, and means for moving the frame vertically and laterally and for supporting it at various adjustments vertically.

8. In a beet topping machine, a carrying frame, a topping frame movably connected therewith, said topping frame including a cross bar having standards near the ends thereof and a centrally disposed forked standard and topping knives carried by the standards.

9. In a beet topping machine, a carrying frame, a topping frame movably connected therewith, said topping frame including a cross bar having standards near the ends thereof and a centrally disposed forked standard, and topping knives carried by the standards, in combination with vertically disposed rearwardly converging fenders carried by the standards at the ends of the cross bar, said fenders being bent to produce substantially horizontal flanges at the front end portions thereof.

10. In a beet topping machine, a carrying frame, a movably supported topping frame, a forked standard connected with the topping frame, and a vertically disposed cutting disk having a shaft journaled in the forked standard, in combination with a divider having three arms, one of said arms being secured near the upper end of the forked standard, and the two remaining arms being connected with the limbs of said standard.

11. In a beet topping machine, a carrying frame, a movably supported topping frame, a forked standard connected with the topping frame, a vertically disposed cutting disk having a shaft journaled in the forked standard, and a driven shaft having hubs provided with radially extending curved fingers, and means for driving said shaft.

In testimony whereof we affix our signatures.

WARD M. PULVER.
LOVELL P. VERNON.